(12) United States Patent
Budd et al.

(10) Patent No.: US 9,658,398 B2
(45) Date of Patent: May 23, 2017

(54) OPTICAL COMPONENT WITH ANGLED-FACET WAVEGUIDE

(71) Applicant: International Business Machines Corporation, Armonk, NY (US)

(72) Inventors: Russell A. Budd, North Salem, NY (US); Daniel M. Kuchta, Patterson, NY (US); Benjamin Giles Lee, New York, NY (US); Laurent Schares, Sleepy Hollow, NY (US); Clint Lee Schow, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/096,996

(22) Filed: Apr. 12, 2016

(65) Prior Publication Data

US 2017/0108643 A1    Apr. 20, 2017

Related U.S. Application Data

(62) Division of application No. 13/898,890, filed on May 21, 2013.

(51) Int. Cl.
| | |
|---|---|
| G02B 6/12 | (2006.01) |
| G02B 6/125 | (2006.01) |
| G02B 6/36 | (2006.01) |
| G02B 6/42 | (2006.01) |

(52) U.S. Cl.
CPC .......... *G02B 6/125* (2013.01); *G02B 6/3652* (2013.01); *G02B 6/423* (2013.01); *G02B 2006/12119* (2013.01); *G02B 2006/12166* (2013.01); *G02B 2006/12173* (2013.01); *G02B 2006/12176* (2013.01); *Y10T 156/10* (2015.01)

(58) Field of Classification Search
None
See application file for complete search history.

(56) References Cited

U.S. PATENT DOCUMENTS

| | | |
|---|---|---|
| 5,321,714 A | 6/1994 | Paoli |
| 6,418,246 B1 | 7/2002 | Gampp |
| 6,529,677 B2 | 3/2003 | Song et al. |

(Continued)

FOREIGN PATENT DOCUMENTS

| | | |
|---|---|---|
| JP | 03103805 A | 4/1991 |
| JP | EP 1243955 A2 | 9/2009 |

OTHER PUBLICATIONS

A.V. Krishnamoorthy et al., "Optical Proximity Communication with Passively Aligned Silicon Photonic Chips," IEEE Journal of Quantum Electronics, Apr. 2009, pp. 409-414, vol. 45, No. 4.

*Primary Examiner* — Michelle R Connelly
(74) *Attorney, Agent, or Firm* — Kurt P. Goudy; Ryan, Mason & Lewis, LLP

(57) ABSTRACT

A system comprises a first optical component comprising at least one waveguide and at least one self-alignment feature; and a second optical component comprising at least another waveguide and at least another self-alignment feature; wherein the self-alignment feature of the second optical component engage to assist in optically-coupling the waveguide of the first optical component and the waveguide of the second optical component when the first optical component has a manufacturing tolerance in a given geometric dimension and is mounted in the second optical component.

12 Claims, 9 Drawing Sheets

(56) References Cited

U.S. PATENT DOCUMENTS

| | | | |
|---|---|---|---|
| 6,556,735 B1 * | 4/2003 | Kato | G02B 6/122 |
| | | | 385/14 |
| 6,937,780 B2 | 8/2005 | Alphonse | |
| 7,471,864 B2 | 12/2008 | Nunoya et al. | |
| 8,149,891 B2 * | 4/2012 | Funabashi | G02B 6/42 |
| | | | 372/50.1 |
| 2002/0150320 A1 * | 10/2002 | Kato | G02B 6/30 |
| | | | 385/14 |
| 2005/0036728 A1 | 2/2005 | Braunisch | |

\* cited by examiner

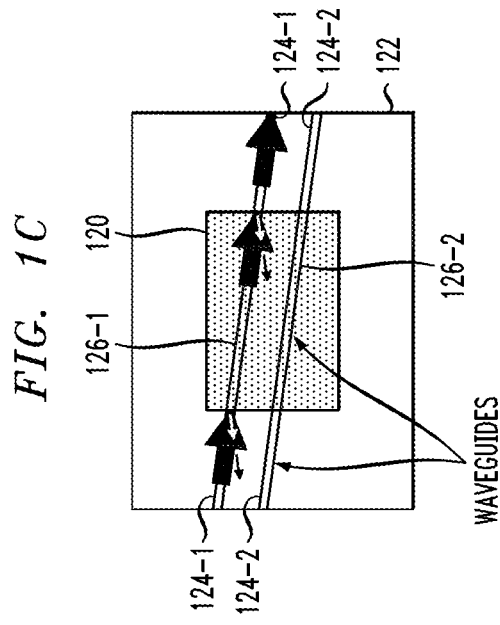
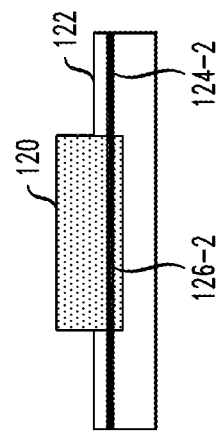
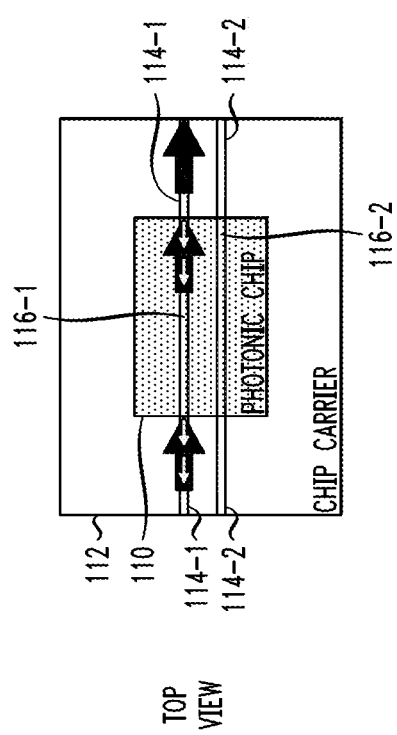
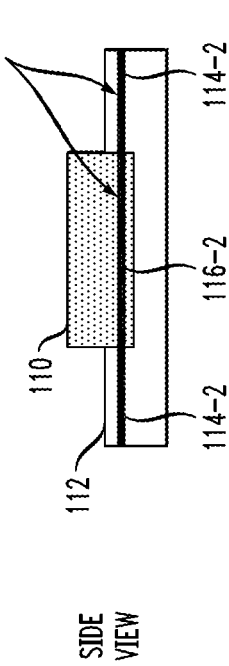

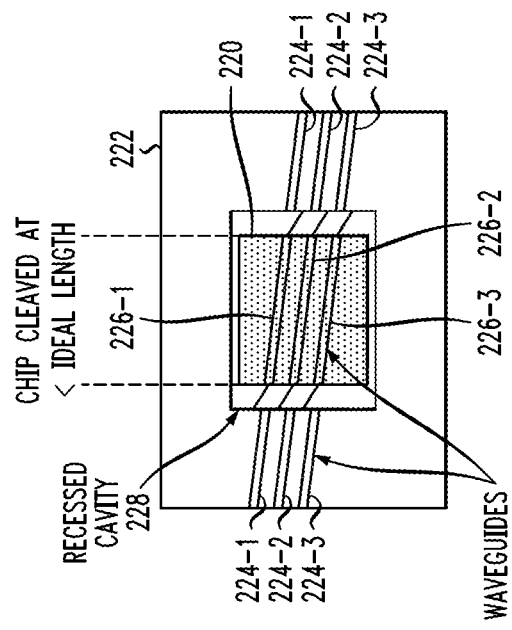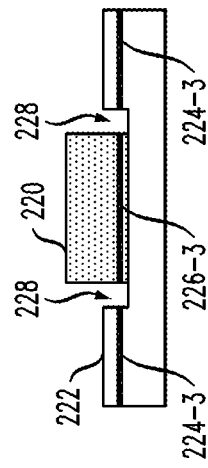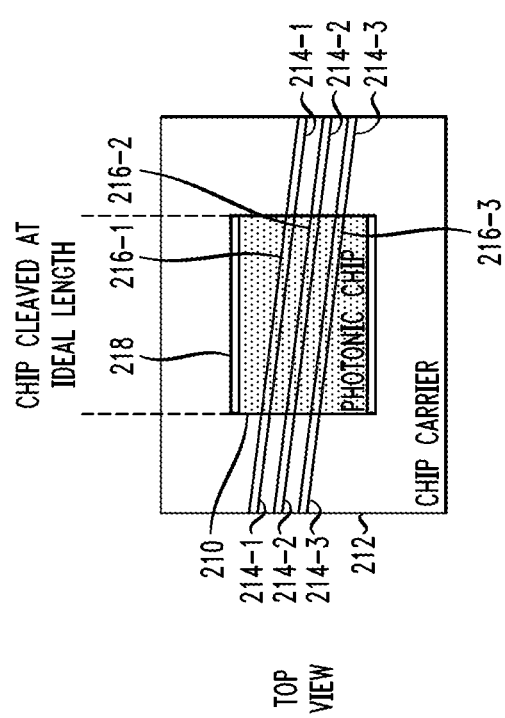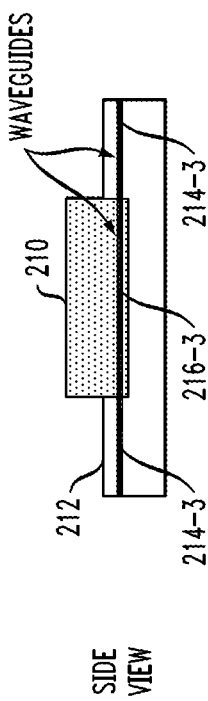

CHIP CLEAVED AT NOMINAL LENGTH

CHIP CLEAVED AT > IDEAL LENGTH

TOP VIEW

SIDE VIEW

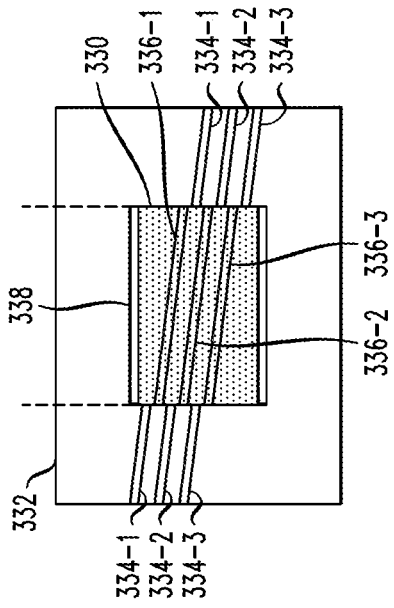
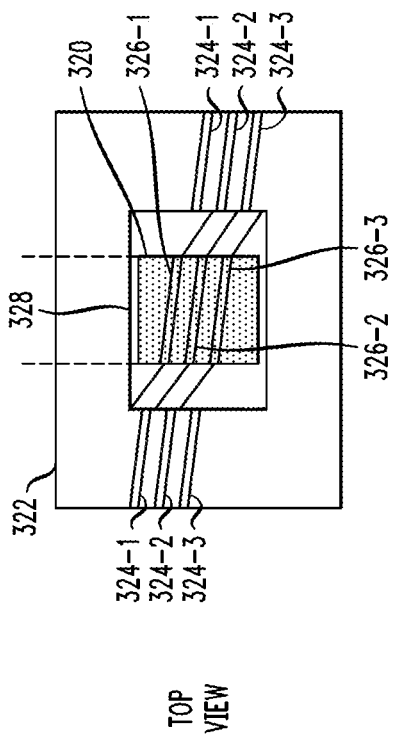
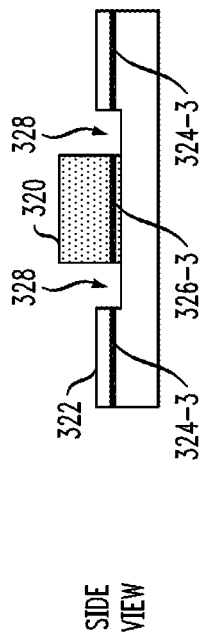

CHIP CLEAVED AT NOMINAL LENGTH

CHIP CLEAVED AT < NOMINAL LENGTH AND SHIFTED DOWN

CHIP CLEAVED AT > NOMINAL
LENGTH AND SHIFTED UP

TOP VIEW

SIDE VIEW

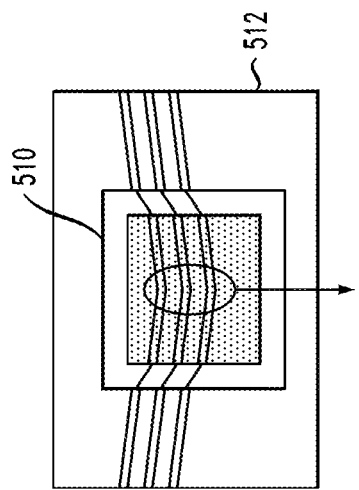
FIG. 5A
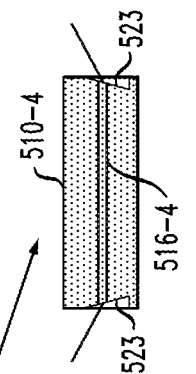
FIG. 5E
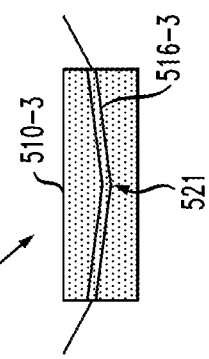
FIG. 5D
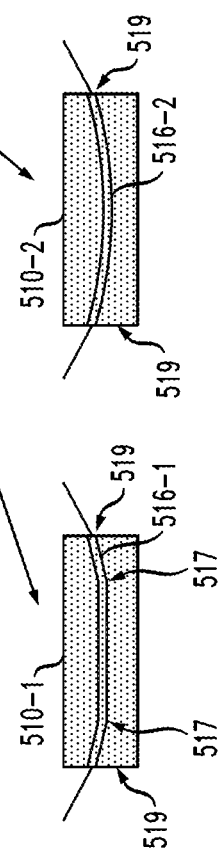
FIG. 5C
FIG. 5B

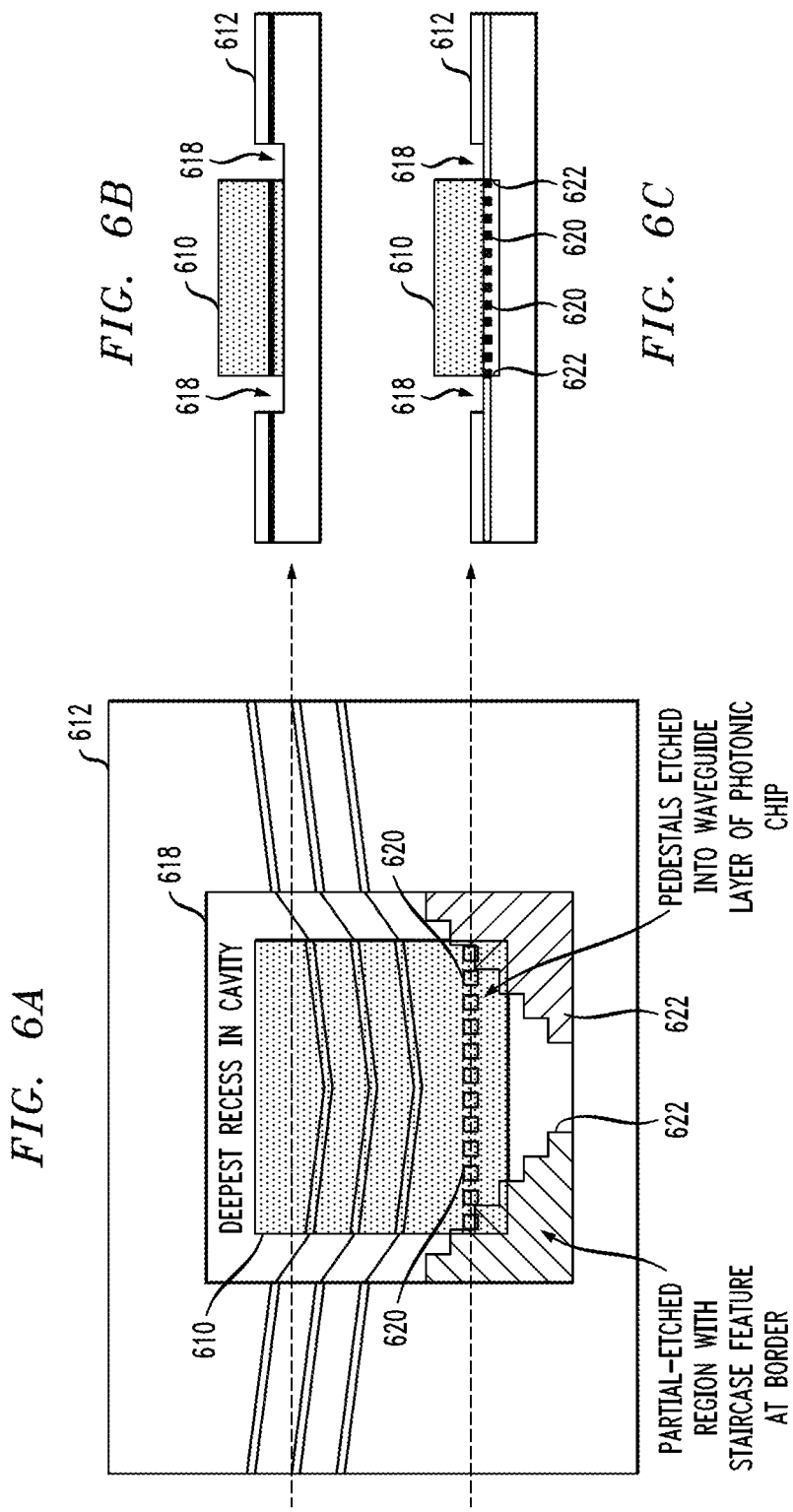

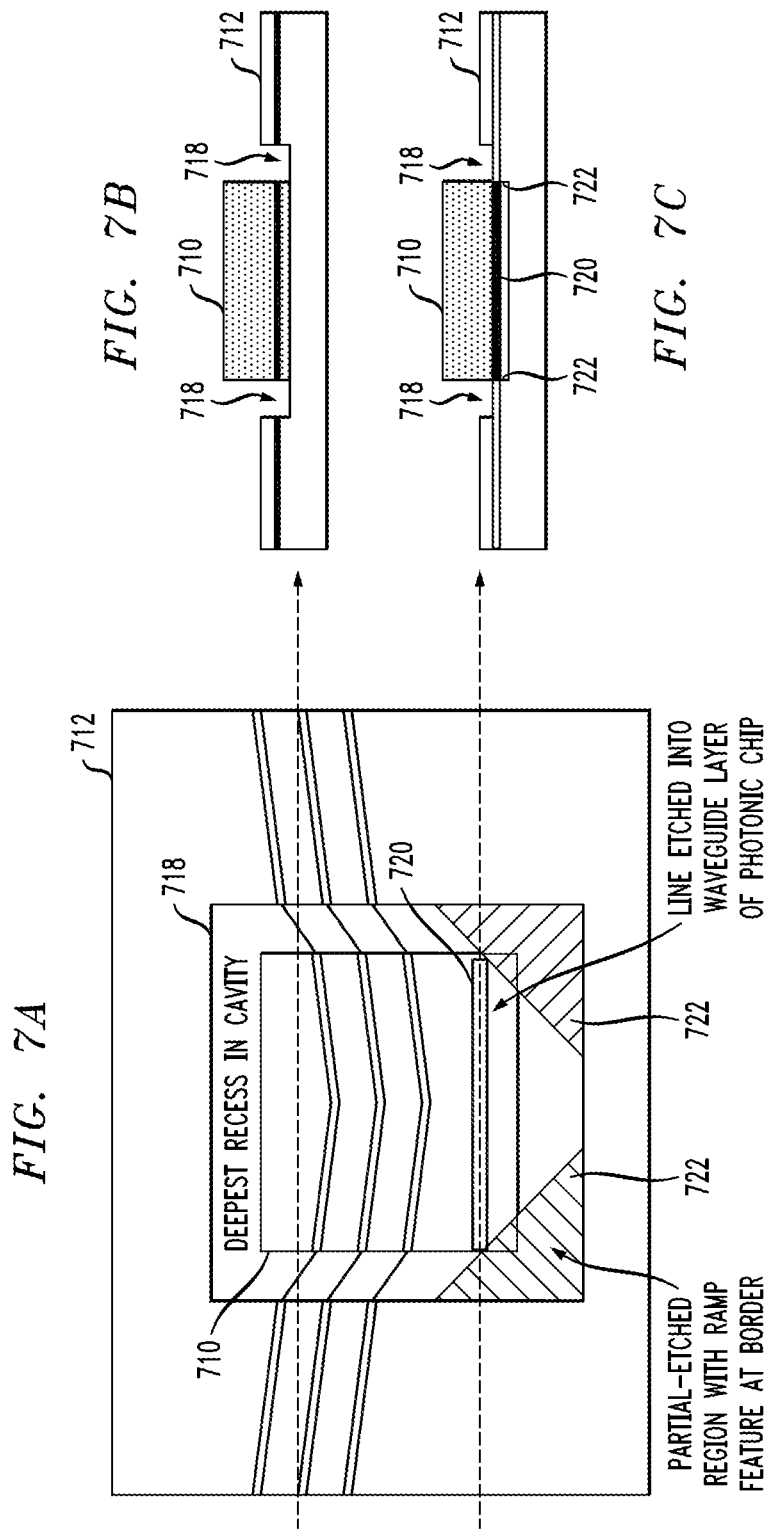

OPTICAL COMPONENT WITH ANGLED-FACET WAVEGUIDE

This invention was made with Government support under Contract No. W911NF-11-2-0059 Defense Advanced Research Projects Agency (DARPA). The Government has certain rights in this invention.

FIELD

The present application relates to optical data transmission and, more particularly, to techniques and mechanisms for improving optical data transmission in a photonic integrated circuit environment.

BACKGROUND

A "photonic chip" is a device that merges nano-photonic technology, i.e., optical technology which employs light at the nanometer scale, with one or more types of integrated circuit technology to provide data transmission on the terabit level. Such photonic chips are capable of being used in many applications and many systems including, but not limited to, data communication systems and data computation systems.

In cases where one photonic chip containing photonic waveguides is placed end-face to end-face (i.e., butt-coupled) on both sides to other photonic chips or photonic carrier packaging vehicles containing photonic waveguides, light may be reflected at the interfaces. This reflected light is known to cause undesirable effects such as, by way of example only, increased laser relative intensity noise (RIN), cavity-induced wavelength dependencies, and optical amplifier gain ripple.

SUMMARY

Embodiments of the invention provide techniques and mechanisms for improving optical data transmission in optical components with angled-facet waveguides.

For example, in one embodiment, an optical component comprises a component body, and at least one angled-facet waveguide formed in the component body, wherein the angled-facet waveguide is substantially mirror-symmetrical in shape relative to a line at or near the center of the angled-facet waveguide.

In another embodiment, a system comprises a first optical component comprising at least one waveguide and at least one self-alignment feature, and a second optical component comprising at least another waveguide and at least another self-alignment feature. The self-alignment feature of the first optical component and the self-alignment feature of the second optical component engage to assist in optically-coupling the waveguide of the first optical component and the waveguide of the second optical component when the first optical component has a manufacturing tolerance in a given geometric dimension and is mounted in the second optical component.

In a further embodiment, a method for aligning two substrates comprising at least one patterned layer implementing photonic waveguides, wherein the length from one edge of one substrate to the opposing edge of the substrate has associated with it a manufacturing tolerance, comprises: patterning a waveguide path such that a waveguide forms a non-orthogonal intersection with one edge of the substrate on which the waveguide resides; further patterning the waveguide path such that the waveguide forms substantially the same non-orthogonal angle with the opposite edge of the substrate, wherein the two edges are substantially parallel and wherein the waveguide path is substantially mirror-symmetrical in shape relative to a line at or near the center of the waveguide path; and providing a lateral offset during substrate-to-substrate bonding in order to compensate for misalignment in optical coupling which occurs as a result of the manufacturing tolerance in a given geometric dimension of the substrate.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIGS. 1A and 1B illustrate top and side views, respectively, of a photonic chip and carrier package utilizing waveguide interfaces without angled facets.

FIGS. 1C and 1D illustrate top and side views, respectively, of a photonic chip and carrier package utilizing waveguide interfaces with angled facets where back-reflected light is not guided.

FIGS. 2A and 2B illustrate top and side views, respectively, of a photonic chip and carrier package utilizing waveguide interfaces with angled facets designed for an ideal length cleave, and realized with an ideal length cleave.

FIGS. 2C and 2D illustrate top and side views, respectively, of a photonic chip and carrier package utilizing waveguide interfaces with angled facets designed for an ideal length cleave, but realized with a less than ideal length cleave.

FIGS. 3C and 3D illustrate top and side views, respectively, of a photonic chip and carrier package utilizing waveguide interfaces with angled facets designed for a nominal length cleave, but realized with a less than nominal length cleave.

FIGS. 3E and 3F illustrate top and side views, respectively, of a photonic chip and carrier package utilizing waveguide interfaces with angled facets designed for a nominal length cleave, but realized with a greater than nominal length cleave.

FIGS. 5A through 5E illustrate methodologies for implementing waveguide bends, according to embodiments of the invention.

FIGS. 6A through 6C illustrate a carrier package with self-aligning features, according to an embodiment of the invention.

FIGS. 7A through 7C illustrate a carrier package with self-aligning features, according to another embodiment of the invention.

DETAILED DESCRIPTION

Figure 3A:
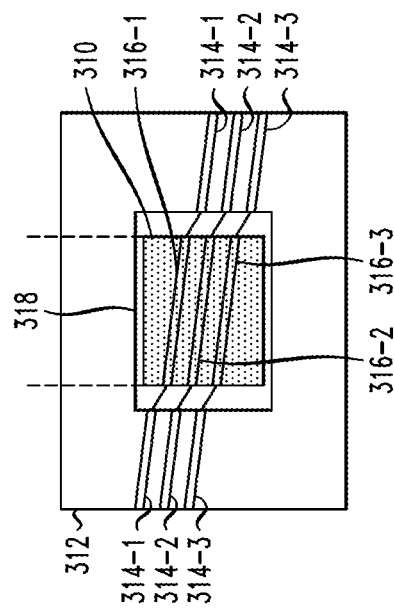
FIGS. 3A and 3B illustrate top and side views, respectively, of a photonic chip and carrier package utilizing waveguide interfaces with angled facets designed for a nominal length cleave, and realized with a nominal length cleave.

Embodiments of the invention will be described below in the context of illustrative photonic chip and carrier package implementations. However, it is to be understood that the techniques and mechanisms described herein are more generally applicable to any photonic chip implementations for which it would be desirable to allow variability in a given geometric dimension of the photonic chip to be compensated for during packaging/bonding of the chip. Note that while the term "length" is used herein as the given geometric dimension in accordance with various illustrative embodiments, the term can be replaced with other geometric dimensional terms such as "width" within the scope of embodiments of the invention.

Also, while the phrases "photonic chip" (or "photonic integrated circuit") and "carrier package" (or "photonic carrier" or "first-level package") are used herein, each component may be more generally referred to as an "optical component." The optical component typically comprises a component body (e.g., a substrate) and at least one waveguide (e.g., a patterned waveguide layer). The phrase optical component is also not intended to be limited to these particular examples.

As mentioned above, in cases where one photonic chip containing photonic waveguides is butt-coupled on both sides to another photonic chip or photonic carrier packaging vehicle (carrier package) containing photonic waveguides, light may be reflected at the interfaces causing undesirable effects. This is illustrated in FIGS. 1A and 1B. As shown, photonic chip 110 is mounted in carrier package 112. A set of waveguides 114-1 and 114-2 of the carrier package 112 substantially align, respectively, with a set of waveguides 116-1 and 116-2 of the photonic chip 110. Light back-reflected from the various interfaces travels in a counter-propagating guided mode. While the propagating light is denoted in FIG. 1A by the right-pointing arrows in waveguides 114-1 and 116-1, the back-reflected light is denoted as left-pointing arrows. Note how the back-reflected light travels in a counter-propagating direction back through the waveguides. This causes undesirable effects such as, for example, increased laser relative intensity noise (RIN), cavity-induced wavelength dependencies, and optical amplifier gain ripple.

Implementing angled facets at the interfaces between chip and carrier is one well-known method for minimizing back reflection. The angle at the interface (or facet) is also known as the input/output (I/O) angle since the angle is measured from the input or output of the waveguide in relation to the side of the chip or carrier package. This is illustrated in FIGS. 1C and 1D. As shown, photonic chip 120 is mounted in carrier package 122. A set of waveguides 124-1 and 124-2 of the carrier package 122 substantially align, respectively, with a set of waveguides 126-1 and 126-2 of the photonic chip 120. With angled facets at the carrier-chip waveguide interface (at input of waveguide) and the chip-carrier waveguide interface (at output of waveguide), the back-reflected light does not travel in a counter-propagating direction back through the waveguides. While the propagating light is denoted in FIG. 1C by the right-pointing arrows in waveguides 124-1 and 126-1, the back-reflected light is denoted as left-pointing arrows.

The system as illustrated in FIGS. 1C and 1D, however, relies on a photonic chip with ideal length, i.e., no tolerance in the length of the photonic chip is allowed. It is to be appreciated that the length of the chip is typically considered to be the geometric dimension along the light propagation direction in the waveguide (i.e., from the input of the waveguide to the output of the waveguide). However, as mentioned above, this dimension could alternatively be called the width of the chip. In any event, in real systems, cleaving to expose the photonic waveguide facets will typically result in length tolerances of about ±10 μm (micrometers) at best. Depending on the waveguide angle and the indices of refraction in the guided and unguided propagation regions, this may result in substantial offset of the light beam coming from the photonic chip and coupling into the photonic carrier, or vice versa. FIGS. 2A through 2F and 3A through 3F illustrate this challenge for the cases where the photonic carrier is and is not designed to include a tolerance to length variability in the photonic chip.

FIGS. 2A and 2B illustrate a photonic chip 210 and a carrier package 212 with angled facets designed for an ideal cleave. The chip 210 is mounted in recessed cavity 218 of the carrier package 212. A set of waveguides 214-1, 214-2 and 214-3 of the carrier package 212 substantially align, respectively, with a set of waveguides 216-1, 216-2 and 216-3 of the photonic chip 210. Here, the photonic chip 210 cleaved at the ideal length couples optimally to the carrier package 212.

Figure 2E:
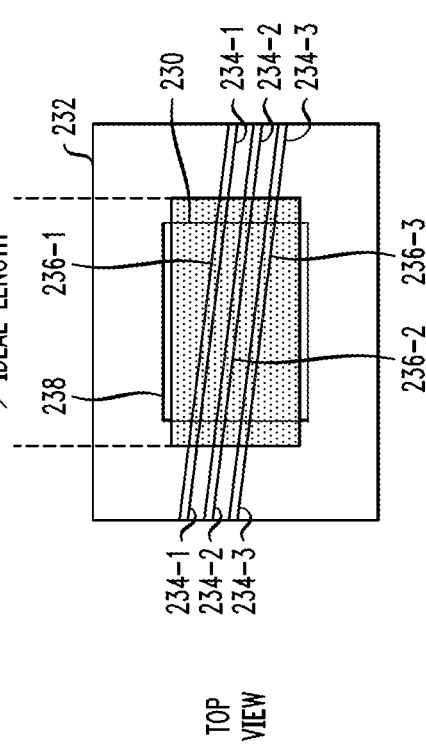
FIGS. 2E and 2F illustrate top and side views, respectively, of a photonic chip and carrier package utilizing waveguide interfaces with angled facets designed for an ideal length cleave, but realized with a greater than ideal length cleave.
Figure 2F:
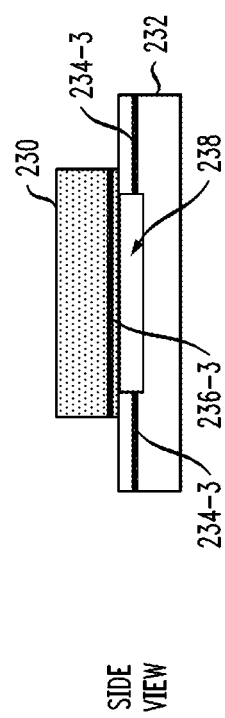

However, it is realized that variation in chip length can cause horizontal misalignment in optical coupling or a complete inability to assemble chips due to an undersized chip cavity. For example, as shown in FIGS. 2C and 2D, a photonic chip 220 is cleaved less than the ideal length causing misalignment, in a recessed cavity 228, between a set of waveguides 224-1, 224-2 and 224-3 of a carrier package 222 and a set of waveguides 226-1, 226-2 and 226-3 of the photonic chip 220. While in FIGS. 2E and 2F, a photonic chip 230 is cleaved greater than the ideal length preventing the chip from being mounted in recessed cavity 238 of a carrier package 232, resulting in an inability to align a set of waveguides 234-1, 234-2 and 234-3 of the carrier package 232 and a set of waveguides 236-1, 236-2 and 236-3 of the photonic chip 230.

Figure 3B:
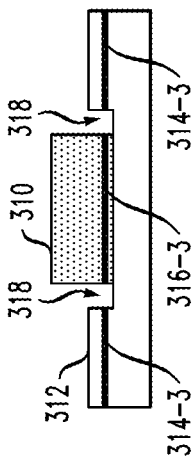

FIGS. 3A and 3B illustrate a photonic chip 310 and a carrier package 312 with angled facets designed with a nominal length cleave. The phrase "nominal length" means the length of the chip as designed appropriately taking into account cleave tolerance with the chip 310 mounted in recessed cavity 318 of the carrier package 312. As shown, because the length of the chip is the nominal length, a set of waveguides 314-1, 314-2 and 314-3 of the carrier package 312 optimally align, respectively, with a set of waveguides 316-1, 316-2 and 316-3 of the photonic chip 310.

This is not the case in the implementations of FIGS. 3C and 3D and FIGS. 3E and 3F. As shown in FIGS. 3C and 3D, a photonic chip 320 is cleaved less than the nominal length and mounted in recessed cavity 328 of a carrier package 322. As such, since the chip is cleaved too short lengthwise, a set of waveguides 324-1, 324-2 and 324-3 of the carrier package 322 do not align, respectively, with a set of waveguides 326-1, 326-2 and 326-3 of the photonic chip 320. In FIGS. 3E and 3F, a photonic chip 330 is cleaved greater than a nominal length and mounted in recessed cavity 338 of a carrier package 332. As such, since the chip is cleaved too long lengthwise, a set of waveguides 334-1, 334-2 and 334-3 of the carrier package 332 do not align, respectively, with a set of waveguides 336-1, 336-2 and 336-3 of the photonic chip 330.

One solution may be to bend the waveguides on the chip 180 degrees such that all angled facets are on the same side of the chip. However, in many photonic platforms that do not have very high index contrast (e.g., semiconductor optical amplifiers, silica planar lightwave circuits), this may degrade performance and result in an unacceptably large footprint, severe optical scattering losses, or undesirable polarization dependencies.

Embodiments of the invention provide for introducing a small bend in the waveguides on the photonic chip in order to provide waveguide facets that have mirror symmetry about the center of the photonic chip. The amount of preferred waveguide bend, e.g., in one embodiment, twice the waveguide facet angle (I/O angle), is typically much smaller than the bends needed to route all of the facets to the same edge of the chip. The mirror symmetry then allows the photonic chip to be shifted in the plane of the photonic carrier during packaging/bonding to optimize the optical coupling despite the length of the photonic chip. Furthermore, embodiments of the invention provide practical lithographic features that allow self-aligned packaging to optimize the photonic chip and carrier coupling in a mass manufacturing environment.

FIGS. 4A through 4F illustrate embodiments of the invention working properly in the case where a photonic chip and carrier package include angled facets and where the system is designed to include tolerances for the length of the photonic chip. The reciprocated waveguides create mirror symmetry for incoming and outgoing facets through the inclusion of a small waveguide bend at or near the chip center. The mirror symmetry of the reciprocated waveguides allows variability in the photonic chip length to be compensated for during packaging/bonding of the chips by shifting the photonic chip with respect to the carrier upward or downward in the plane of the photonic carrier (carrier package).

Figure 4A:
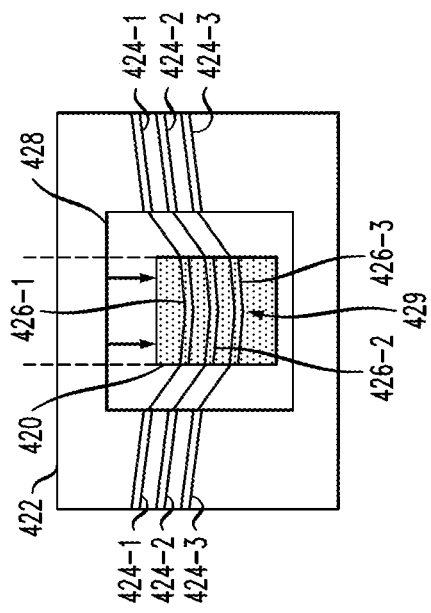
FIGS. 4A and 4B illustrate top and side views, respectively, of a photonic chip and carrier package utilizing waveguide interfaces with angled facets designed for and realized with a nominal length cleave, according to an embodiment of the invention.
Figure 4B:
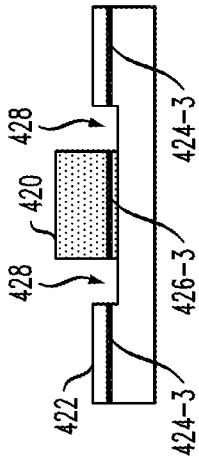

FIGS. 4A and 4B illustrate a photonic chip 410 and a carrier package 412 with angled facets designed for a nominal length cleave. A set of waveguides 414-1, 414-2 and 414-3 of the carrier package 412 optimally align, respectively, with a set of waveguides 416-1, 416-2 and 416-3 of the photonic chip 410. Here, the photonic chip 410 which is cleaved at the nominal length and mounted in recessed cavity 418 couples optimally to the carrier package 412 due to the inclusion of bend (angle) 419 introduced in each waveguide of the set of waveguides 416-1, 416-2 and 416-3. Due to the mirror symmetry of the waveguide at the center of the chip caused by the bend, the chip waveguides are referred to as reciprocated waveguides.

Figure 4C:
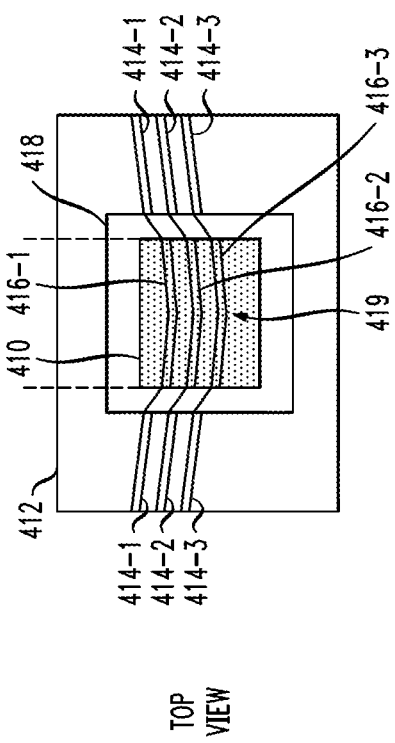
FIGS. 4C and 4D illustrate top and side views, respectively, of a photonic chip and carrier package utilizing waveguide interfaces with angled facets designed for a nominal length cleave and realized with a less than nominal length cleave with photonic chip shifted, according to an embodiment of the invention.
Figure 4D:
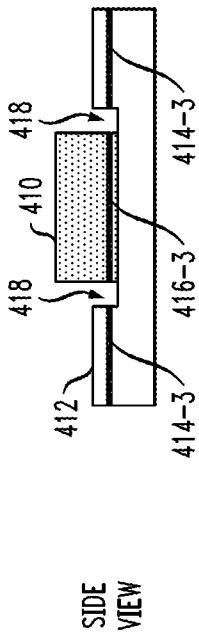

FIGS. 4C and 4D illustrate a photonic chip 420 and a carrier package 422 with angled facets designed for a less than nominal length cleave. During packaging/bonding, the chip 420 is shifted downward in recessed cavity 428 of the carrier package 422. Note that the shift, in this embodiment, is in the geometric dimension perpendicular to the length dimension of the photonic chip. Thus, as shown, a set of waveguides 424-1, 424-2 and 424-3 of the carrier package 422 near optimally align, respectively, with a set of waveguides 426-1, 426-2 and 426-3 of the photonic chip 420. Here, the photonic chip 420 cleaved at less than the nominal length couples near optimally to the carrier package 422 due to the inclusion of bend (angle) 429 introduced in each waveguide of the set of waveguides 426-1, 426-2 and 426-3, and the downward shift of the chip 420 in the recessed cavity 428 of the carrier package 422. Again, waveguides 426-1, 426-2 and 426-3 are referred to here as reciprocated waveguides.

Figure 4E:
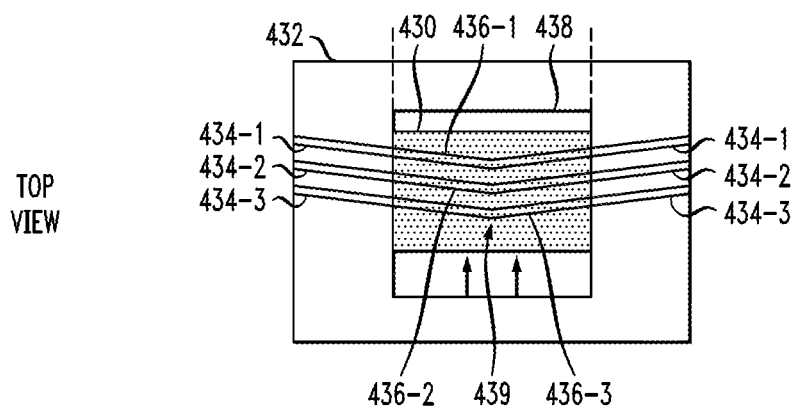
FIGS. 4E and 4F illustrate top and side views, respectively, of a photonic chip and carrier package utilizing waveguide interfaces with angled facets designed for a nominal length cleave and realized with a greater than nominal length cleave with photonic chip shifted, according to an embodiment of the invention.
Figure 4F:
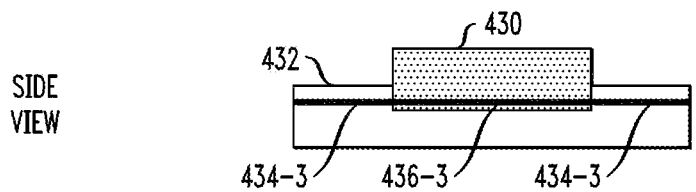

FIGS. 4E and 4F illustrate a photonic chip 430 and a carrier package 432 with angled facets designed for a greater than nominal length cleave and the chip 430 shifted upward in recessed cavity 438 of the carrier package 432. A set of waveguides 434-1, 434-2 and 434-3 of the carrier package 432 near optimally align, respectively, with a set of waveguides 436-1, 436-2 and 436-3 of the photonic chip 430. Here, the photonic chip 430 cleaved at greater than the nominal length couples near optimally to the carrier package 432 due to the inclusion of bend (angle) 439 introduced in each waveguide of the set of waveguides 436-1, 436-2 and 436-3, and the upward shift of the chip 430 in the recessed cavity 438 of the carrier package 432. Again, waveguides 436-1, 436-2 and 436-3 are referred to here as reciprocated waveguides.

Thus, as shown in the implementations of FIGS. 4C and 4D and FIGS. 4E and 4F, variation in chip length causing misalignment in optical coupling is offset by shifting placement of the chip relative to the carrier. Alignment of the chip waveguides and carrier waveguides (i.e., how much to shift the chip upward or downward in the recessed cavity of the carrier package) can be active, passive with vision alignment, or passive with self-aligning lithographic features as will be described below in FIGS. 6A through 6C and FIGS. 7A through 7C.

FIGS. 5A through 5E illustrate methodologies for implementing waveguide bends, according to embodiments of the invention. FIG. 5A shows a photonic chip 510 and a carrier package 512 similar to the implementation of FIG. 4C, however, the assembly shown in FIG. 5A could represent any of the embodiments illustrated in FIG. 4 (i.e., nominal length cleave, less than nominal length cleave, and greater than nominal length cleave). FIGS. 5B through 5E show illustrative embodiments of bends that are implemented in the waveguide(s) of the photonic chip 510. Other bends and configurations are contemplated to be within the scope of embodiments of the invention.

In some embodiments, as illustrated in FIG. 5B (photonic chip 510-1 with waveguide 516-1), it is preferable for the waveguides to remain orthogonal to the chip edges over a large portion of the chip. In such a case, the bends (517 in FIG. 5B) are implemented near the chip edges (519 in FIG. 5B) so that the waveguides are angled only in the vicinity of the coupling region. As described, angles may vary depending on physical waveguide dimensions, index of refraction of the waveguide core and cladding regions, and index of refraction of the gap (coupling region). By way of example only, typical angles (measured from a line normal to the chip edge) range from about 5 to 15 degrees.

In other embodiments, as illustrated in FIG. 5C (photonic chip 510-2 with waveguide 516-2), it is preferable to implement the smallest bending radius possible (minimum bend radius) by forming a large constant-radius arc from chip edge to chip edge (519 in FIG. 5C). By way of example only, minimum bend radii may vary from about 1 micrometer (µm) to 1 centimeter (cm) depending on photonic platform details. For example, a minimum bend radius of about 1 cm could be used to achieve about a 7 degree waveguide angle (measured from a line normal to the chip edge) with a chip length of only about 2.4 millimeters (mm).

In further embodiments, as illustrated in FIG. 5D (photonic chip 510-3 with waveguide 516-3), it is preferable to undergo as few bends as possible. Thus, one single bend (521 in FIG. 5D) is implemented at or near the center of the chip. This bend would need to undergo a bend of twice the angle of the waveguide facet, by way of example only, typically about 10 to 30 degrees.

In still other embodiments, as illustrated in FIG. 5E (photonic chip 510-4 with waveguide 516-4), it is preferred to use a straight waveguide with angled etched facets. That is, using lithographically defined etching procedures instead of cleaving, dicing, or polishing to form the optical facets, features (or shapes) are fabricated within the chip edge (e.g., etched features 523 in FIG. 5D). Typically, by way of example only, these etched features can resolve shapes below about 10 μm, so that waveguide arrays with pitch near about 100 μm can easily be formed such that each waveguide in the array is fabricated with its own etched feature 523. Also, the chip's length tolerance is usually much more precise (e.g., +/−1 um) than that obtained using cleaving. Using this approach, it is possible to carry out illustrative methods of the invention without requiring any bends or turns of the optical waveguide on the photonic chip or photonic carrier. This embodiment provides an important capability since waveguide bends may degrade optical performance in certain circumstances and in some design cases are not allowed, e.g., in loosely guided modes or in anisotropic materials.

FIGS. 6A through 6C illustrate a carrier package with self-aligning features, according to an embodiment of the invention. More particularly, FIGS. 6A through 6C show an alignment implementation using self-aligning lithographic features compatible with mass manufacturing of an assembly including photonic chip 610 mounted in recessed cavity 618 of a carrier package 612. As shown, a row of pedestals 620 is etched into the waveguide layer on the photonic chip 610, while a region with staircase borders 622 is partially etched into the recessed cavity 618. When bonded, the chip 610 is pushed/pulled so that pedestal features in the chip abut (are pushed substantially flush to) the staircase feature 622 in the recessed cavity 618 of the carrier package 612. As more chip-edge is cleaved off, the narrower chip gets pushed down further into the gap between the staircases, as is desirable for optimal coupling. When less chip-edge is cleaved, the opposite happens, as is desirable. Thus, FIG. 6A shows a top view of this self-aligning passive alignment methodology utilizing lithographic features in the chip and carrier, while the dashed arrows point to side views (FIGS. 6B and 6C) at different locations of the chip and carrier system.

FIGS. 7A through 7C illustrate a carrier package (photonic chip 710 mounted in recessed cavity 718 of a carrier package 712) with self-aligning features, according to another embodiment of the invention. Instead of pedestals and staircases (i.e., discrete steps) as in the embodiment of FIGS. 6A through 6C, a continuous version is realized by replacing the pedestals in the chip with a line feature 720 in the chip 710 and the staircase in the carrier with a ramp feature 722.

Note that the staircase rise and run (FIGS. 6A through 6C) or the slope of the ramp (FIGS. 7A through 7C) should be designed optimally to match the desired offset for maximum optical coupling using Snell's Law. For example, according to the embodiment in FIG. 6, the pedestal and staircase features could be fabricated with sub-micrometer precision, resulting in a pedestal pitch of about 1 μm. If light were propagating in the gap region with an angle of about 18 degrees, then each micrometer of uncertainty in the chip length could be compensated for laterally by about ⅓ of a micrometer, resulting in acceptable lateral optical alignment. A similar example is achievable for the embodiment in FIG. 7, but would be limited by fabrication precision to a much lesser degree.

It is to be understood that translation of the photonic chip results in a much smaller scale (e.g., a few microns) than the size of the bond pads (e.g., tens of microns). Rotation in the photonic chip is prevented so long as the cleaves on the left and right side can be matched to within one pedestal (i.e., the staircase lateral dimension). A highly asymmetric cleave could pose a problem, but additional features can be added to prevent chip rotation as well.

Although the illustrative descriptions above focus on facets which are cleaved, alternative embodiments of the invention include chips having facets that are diced and polished or that are etched, or any other manner of facet exposure that has associated with it some finite length tolerance.

Further, although the illustrative descriptions above address butt-coupling implementations, alternative embodiments of the invention also include chips having facets which are coupled in another manner besides butt-coupling (e.g., lensed coupling, etc.), so long as back-reflections may occur under the coupling scheme.

Still further, although the illustrative descriptions above focus on length tolerances of the photonic chip, alternative embodiments of the invention also correct for variations in the length tolerances of the photonic carrier.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of for aligning two substrates comprising at least one patterned waveguide layer implementing photonic waveguides, wherein a length from one edge of one substrate to an opposing edge of the one substrate has an associated manufacturing tolerance, and wherein the method comprises:

patterning a waveguide path such that a waveguide forms a non-orthogonal intersection with one edge of the substrate on which the waveguide resides;

further patterning the waveguide path such that the waveguide forms substantially the same non-orthogonal angle with the opposite edge of the substrate, wherein the two edges are substantially parallel and wherein the waveguide path is substantially mirror-symmetrical in shape relative to a line at or near the center of the waveguide path; and providing a lateral offset during substrate-to-substrate bonding in order to compensate for misalignment in optical coupling which occurs as a result of the manufacturing tolerance in a given geometric dimension of the substrate;

wherein the two substrates are a chip and a package, respectively, and wherein the package contains a recessed cavity which receives the chip; and wherein the recessed cavity comprises staircase features and the patterned waveguide layer comprises pedestal features, wherein the rise and run of the staircase features are matched to the pedestal features such that misalignment in optical coupling due to a given geometric dimensional tolerance of at least one of the two substrates is compensated when a portion of the pedestal features are pushed substantially flush against a portion of the staircase features.

2. The method of claim 1, wherein the manufacturing tolerance arises from a cleaving process.

3. The method of claim 1, wherein the manufacturing tolerance arises from a dicing and polishing process.

4. The method of claim 1, wherein the manufacturing tolerance arises from an etching process.

5. The method of claim 1, wherein the optical coupling between waveguides of one of the two substrates and waveguides of the other of the two substrates is achieved using butt-coupling.

6. The method of claim 1, wherein the optical coupling between waveguides of one of the two substrates and waveguides of the other of the two substrates is achieved using lensed coupling.

7. A method for aligning two substrates comprising at least one patterned waveguide layer implementing photonic waveguides, wherein a length from one edge of one substrate to an opposing edge of the one substrate has an associated manufacturing tolerance, and wherein the method comprises:

patterning a waveguide path such that a waveguide forms a non-orthogonal intersection with one edge of the substrate on which the waveguide resides;

further patterning the waveguide path such that the waveguide forms substantially the same non-orthogonal angle with the opposite edge of the substrate, wherein the two edges are substantially parallel and wherein the waveguide path is substantially mirror-symmetrical in shape relative to a line at or near the center of the waveguide path; and providing a lateral offset during substrate-to-substrate bonding in order to compensate for misalignment in optical coupling which occurs as a result of the manufacturing tolerance in a given geometric dimension of the substrate;

wherein the two substrates are a chip and a package, respectively, and wherein the package contains a recessed cavity which receives the chip; and wherein the recessed cavity comprises ramp features and the patterned waveguide layer comprises a line feature, wherein the rise of the ramp features is matched to the line feature such that misalignment in optical coupling due to a given geometric dimensional tolerance of at least one of the two substrates is compensated when a portion of the line feature is pushed substantially flush against a portion of the ramp features.

8. The method of claim 7, wherein the manufacturing tolerance arises from a cleaving process.

9. The method of claim 7, wherein the manufacturing tolerance arises from a dicing and polishing process.

10. The method of claim 7, wherein the manufacturing tolerance arises from an etching process.

11. The method of claim 7, wherein the optical coupling between waveguides of one of the two substrates and waveguides of the other of the two substrates is achieved using butt-coupling.

12. The method of claim 7, wherein the optical coupling between waveguides of one of the two substrates and waveguides of the other of the two substrates is achieved using lensed coupling.

* * * * *